United States Patent [19]

Rouverol

[11] E Re. 28,696

[45] Reissued Jan. 27, 1976

[54] PITCH POINT ACTION GEARING

[76] Inventor: William S. Rouverol, P.O. Box 9122, Berkeley, Calif. 94709

[22] Filed: Mar. 13, 1974

[21] Appl. No.: 450,616

Related U.S. Patent Documents

Reissue of:

[64] Patent No.: 3,438,279
Issued: Apr. 15, 1969
Appl. No.: 644,173
Filed: June 7, 1967

[52] U.S. Cl. ..... 74/462
[51] Int. Cl.[2] ..... F16H 55/14
[58] Field of Search ..... 74/458, 462, 467, 468

[56] References Cited

UNITED STATES PATENTS 2,230,418 2/1941 Wildhaber ..... 74/462
2,686,155 8/1954 Willis et al. ..... 252/12

*Primary Examiner*—Leonard H. Gerin
*Attorney, Agent, or Firm*—Gordon Wood

[57] ABSTRACT

A system of helical or spiral bevel gearing that by violating the "law of gearing" restricts the tooth action entirely to the pitch point. The greatly reduced sliding velocity between the teeth of mating gears permits them to be made of "dry bearing" or other moldable materials without exceeding rated PV values, and a multiplicity of contact points moving transversely along the pitch line insures continuity of action.

7 Claims, 4 Drawing Figures

Figure 1:
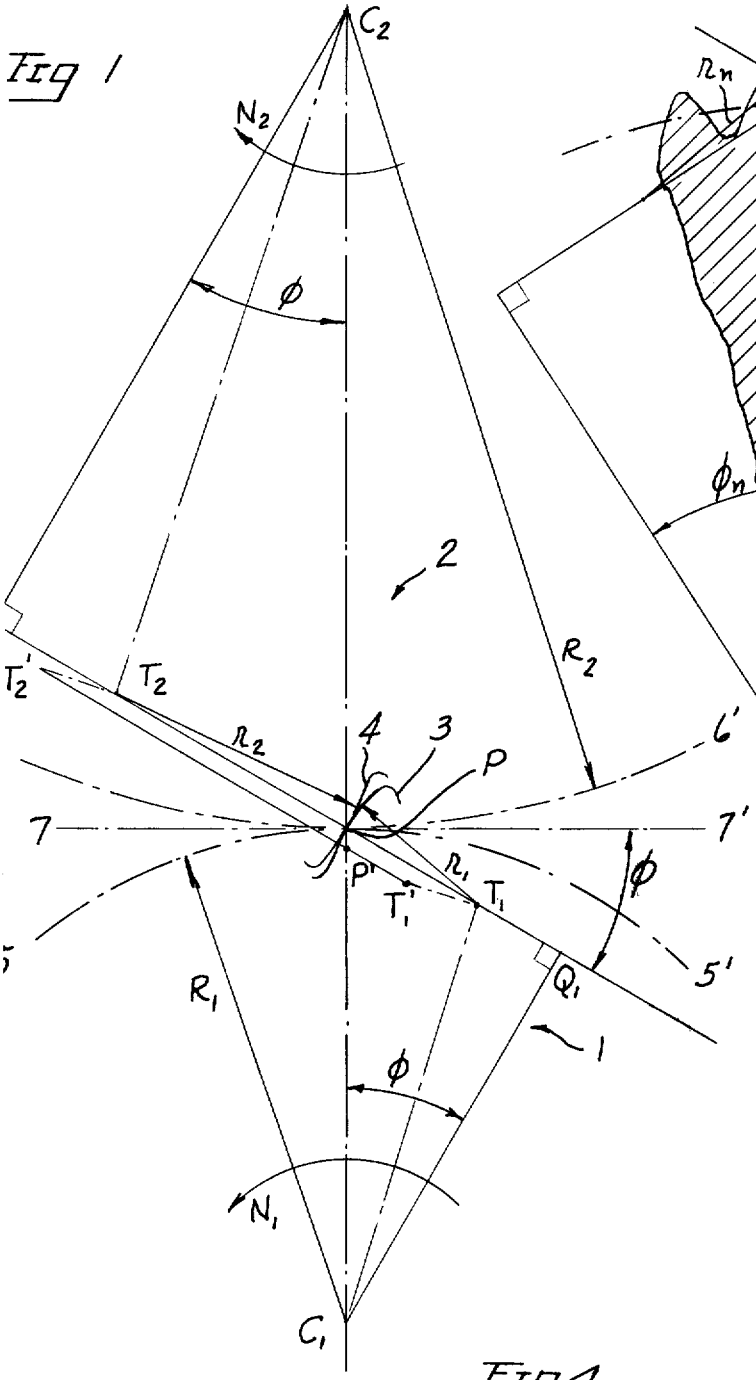

INVENTOR.
WILLIAM S. ROUVEROL
BY Gordon Wood

PITCH POINT ACTION GEARING

Matter enclosed in heavy brackets [ ] appears in the original patent but forms no part of this reissue specification; matter printed in italics indicates the additions made by reissue.

This invention relates to the profile and shape of gear teeth. The gearing system herein disclosed in intended to be especially adapted to gears molded from dry bearing materials, but its advantages are such that it will find many applications in gears made of a wide variety of materials, including elastomers, plastics, die casting alloys, sintered metals and hardened steel, as well as combinations of these materials.

Designing gears of reasonable power capacity and wear life which can be made of moldable materials has generally been considered an impossibility. The problem has been that the involute system of gearing, because it has proven to be most satisfactory for cut gearing, must necessarily be the optimum system for molded gearing. This is an incorrect assumption, and the present invention is intended to disclose a new system of gearing that is considerably more appropriate for molded gearing than the involute system.

As a class, moldable materials have certain properties which differ from those of the harder materials from which gears are customarily machined (steel, cast iron, bronze). One of these properties, allowable compressive stress, is considerably lower than that for the hard materials, and it has generally been assumed that because of this the capacity of molded gearing could never be very great. This assumption is also incorrect, because moldable materials are generally softer (have a lower modulus of elasticity) than cut gear materials, so that tooth surface loads tend to be distributed over much larger areas. In addition, local deformations are much greater, so that considerably wider gear faces may be used without the inequalities of loading which occur in hard gears as a result of slight axial misalignment. Between the larger surface areas of contact and the wider gear faces possible with moldable materials, gears can readily be designed that will accommodate tooth loads substantially as great as those of the best heat treated steel.

The real problem of making satisfactory molded gearing is, therefore, not one of limited tooth load, but is rather a problem of low resistance to abrasion and low thermal conductivity. These problems have long been recognized in the design of molded bearings, where they have been taken into consideration by means of what is called the PV factor. This quantity, which is the product of bearing pressure in pounds per square inch and sliding velocity in feet per minute, reflects both the rate of wear in a rubbing contact and, in extreme service, the power converted to frictional heat per unit projected area of bearing surface which must be dissipated if the bearing is not to be destroyed by overheating.

PV factors for molded bearings vary considerably, from a few hundred to as high as thirty or forty thousand, depending on the materials, lubrication, ambient temperatures, lining thickness, required wear life, etc. A typical value, for molybdenum disulfied filled nylon, unlubricated, would be about 8,000.

The example of a dry bearing material with a PV of 8,000 is instructive to consider in connection with the unsuitability of the involute system for molded gearing. This particular material has a compressive strength of 20,000 p.s.i., and if this is to be fully utilized, and yet the allowable PV is not to be exceeded, the sliding velocity for the teeth should not exceed 8,000/20,000 or 0.4 feet per minute.

If involute gears are designed for minimum surface stress in the tooth contact area, they must be designed with the minimum number of teeth that can be mated without tooth interference. This means that engagement starts substantially at the point where the line of action is tangent to the base circle of the driving gear and continues to the point where the addendum circle of the driving gear intersects the line of action. This produces an angle of action for 20° stub teeth of about 36°, or 1/10 revolution, and a sliding velocity $V_s$ between mating teeth which starts at $$V_s = V\left(\frac{R_1}{R_2}+1\right)\sin\phi \qquad (1)$$

where V is the pitch line velocity, $R_1$ and $R_2$ the pitch radii of the gears, and $\phi$ the pressure angle. From this maximum value at the point of engagement, which amounts to about two thirds of the pitch line velocity if the gears have equal diameters and 20° teeth, the sliding velocity reduces almost linearly to zero at the pitch point, then increases to almost the same as the starting value at the end of the contact angle. Hence the most serious condition is for the flanks and tips of the mating teeth, and this is the condition which limits the utility of the gears.

With regard to actual values of sliding velocity, it is probably reasonable to consider an average service for power transmission gearing to be perhaps a 6-inch gear attached to a 1725 r.p.m. induction motor (or a 3-inch gear attached to a 3450 r.p.m. motor). This gives a pitch line velocity of about 2700 feet per minute, and a maximum sliding velocity at the initiation of tooth contact of about 1800 feet per minute. When this value is compared to the 0.4 foot per minute that would be recommended on the basis of the PV for molded nylon gears, it becomes evident why such gears have been of necessity restricted to "light service." If the sliding velocity of 1800 feet per minute is to be taken into consideration, the compressive load on the teeth should be reduced to 8000/1800 or about 4.4 p.s.i., instead of 20,000 p.s.i.

Some modifications in the above evaluation should be made to take account of the fact that the critical combination of load and sliding velocity is only imposed on a particular point on a tooth for a few degrees of each 360° revolution. This would lead to longer service lives than would be obtained from continuously operated bearings of equivalent PV loading, or, alternatively somewhat higher PV values could be employed in gear design to give corresponding service lives. However these corrections are nowhere near sufficient to make up for the fact that for rotational speeds normally encountered in most power transmission applications, involute tooth shapes impose too high sliding velocities to permit the use of molded gearing in any circumstances except those which impose tooth loads that are only a fraction of the tooth surface compressive strength.

The object of the present invention is therefore to provide a new tooth form that will cause the sliding velocity between mating teeth to be as small as possible negative. This would simply mean that the tooth profile of negative radius of curvature was concave instead of convex, and had its center of curvature between $T_1$ and $Q_1$, or $T_2$ and $Q_2$. Unlike the Wildhaber-Novikov system, however (U.S. Patent No. 1,601,750; Product Engineering, Sept. 17, 1962, p. 91), there is no special advantage in mating concave and convex teeth. In the gearing herein disclosed, the maximum relative radius of curvature r that can be used without interference and with rapid profile separation on either side of the pitch point P is the same for both convex-concave and convex-convex teeth, namely the value indicated in Equation 2. Since the Hertzian contact stress is based on relative radius of curvature r, it follows that the only effect of using concave-convex profiles in the present invention is a loss in interchangeability without any compensating gain in allowable tooth load.

With regard to the Wildhaber-Novikov system, it may be noted that while it allows an increase in tooth load relative to the involute system in the case of lubricated cut gearing, it is basically even less suitable for unlubricated molded gearing than the involute system. This is because the Wildhaber-Novikov system places the centers of curvature of the mating concave-convex profiles substantially at the pitch point, so that the contact surfaces must be considerably removed from the pitch point and consequently lie in a region of relatively rapid sliding. The average sliding velocity for a typical Wildhaber-Novikov gear is about half the pitch line velocity, as compared to one third for the involute system.

In contrast to these average sliding velocities of thirty to fifty percent of the pitch line velocity for typical involute and Wildhaber-Novikov gears respectively, the average sliding velocity for gears embodying the herein disclosed invention is of the order of one percent of the pitch line velocity, and the increase in capacity based on PV values for molded dry bearing materials will be commensurate. That there is any sliding velocity at all in the subject gearing system is due to the fact that the moduli of elasticity of moldable materials are such that the tooth contact extends over a relatively large area, only the center of which has zero velocity by virtue of its being exactly at the pitch point. The edges of the contact area may be a degree or so of rotation in front of or beyond the pitch point, depending on the magnitude of the helix or spiral angle. But these fringe areas that are subjected to minor sliding are more lightly loaded than the center of the contact area, in any case.

It should also be noted, in connection with Equations 2 and 3, that $R_1$ or $R_2$ may go to infinity in the case of rack, and $r_1$ or $r_2$ may also go to infinity if one of any pair of mating gears has flat teeth; the equations are still valid for these conditions, however.

Figure 2:
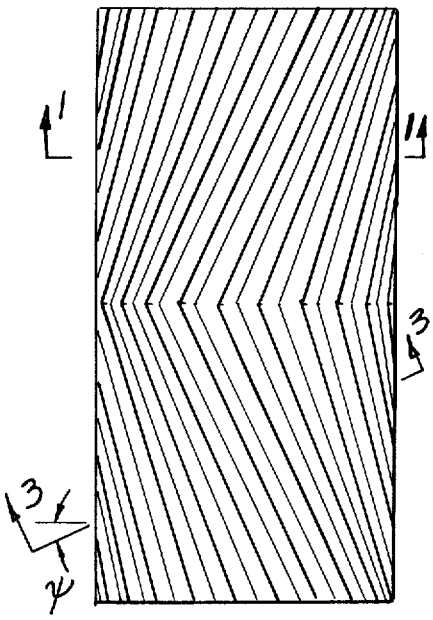

With regard to the other drawings, FIG. 2 is a plan view of gear 1 of FIG. 1, showing a herringbone construction. It will be noted that the face length is quite wide relative to the gear diameter, since there are no serious alignment problems in this system. Also, since the costs are not greatly increased by using herringbone teeth, and the face is amply wide, advantage may be taken of the herringbone construction to eliminate internal axial thrust.

Figure 3:
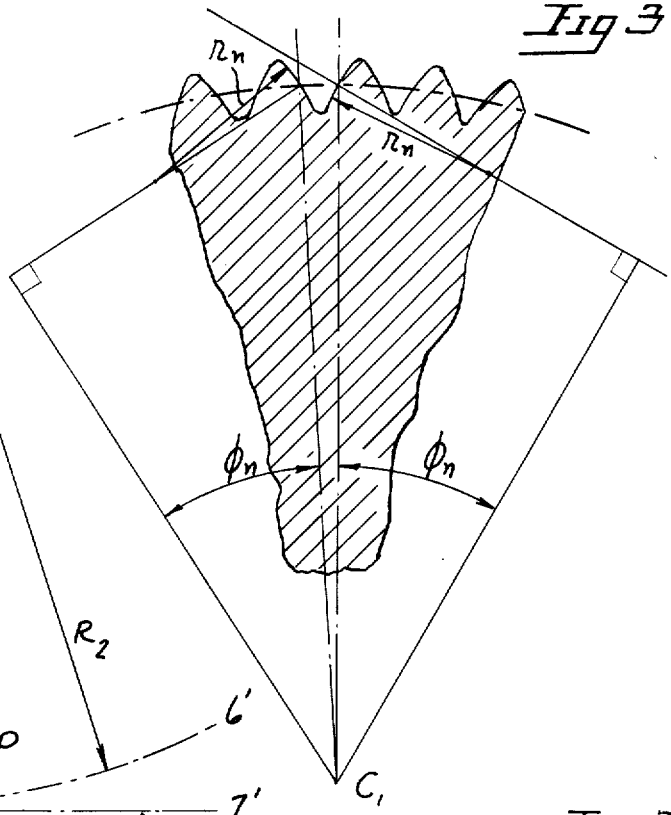

FIG. 3 shows the front and back tooth profiles in a sectional plane of FIG. 2 normal to the tooth directions. As in conventional helical gearing, the pressure angle $\phi_n$ is related to that in the plane of rotation by the standard equation $$\tan \phi_n = \tan \phi \cos \psi \tag{4}$$

where $\psi$ is the helix angle. Similarly, the radius of curvature in the normal plane $r_{n1}$ relates to that in the plane of rotation $r_1$ as follows:

$$r_{n_1} = r_1 \cos^2\psi \left( \frac{\cos^2\phi}{\cos^2\psi} + \sin^2 \phi \right)^{3/2} \tag{5}$$

For a pair of mating gears, the relative radius of curvature $r_n$ will be:

$$r_n = r \cos^2\psi \left( \frac{\cos^2\phi}{\cos^2\psi} + \sin^2 \phi \right)^{3/2} \tag{6}$$

where r is the relative radius of curvature in the plane of rotation as given by Equation 3. In practice, the most useful pressure and helix angles are such (20 to 40°) that the argument of Equation 6 is not far from unity, and since the teeth in this system tend to be quite fine, profiles cut to an exact circular arc in the normal plane will be substantially circular arcs in the plane of rotation, and vice versa.

Figure 4:
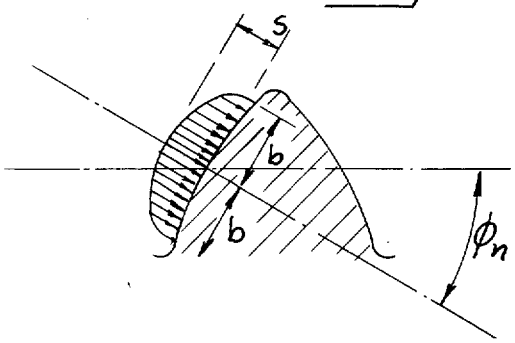

FIG. 4, showing an enlarged section of a tooth 3 in the normal plane, indicates the pressure distribution over the slant height of the tooth. Unlike the involute and epicyclic gear systems in which mating teeth slide over one another, the teeth in this system are subjected to almost no sliding and hence the tooth load should be distributed over substantially the full slant height of the tooth. Except for teeth involving elastomer materials, the height of the contact area 2b is usually less than 1/16 of an inch, and the circular pitch correspondingly small. For example, a gear such as that shown in FIG. 2 made of nylon filled with molybdenum disulfide would have the following specifications:

| | |
|---|---|
| Pitch diameter | 3" |
| Length | 3" |
| Pressure angle | 30° |
| Helix angle | 32°30' |
| Diametral pitch | 60 |
| Number of teeth | 180 |
| Number of contact points across full face of gear | 36 |
| Maximum surface stress | 20,000 p.s.i. |
| Power capacity at 3450 r.p.m. and PV of 8000 | Approx. 160 HP |
| Separation rate factor | 0.5 |

The especially unusual features of this type of gear may be noted: the large number of teeth (180), the large number of separate contact areas in the three inch length of face (36), and the exceptionally high power capacity for unlubricated molded plastic gearing (160 HP).

It should also be noted in connection with FIG. 4 that an accurate determination of the minor semiaxis b of the contact ellipse may be calculated from the general Hertz equations for pressure between bodies with curvature in two directions (c.f., Theory of Elasticity, S. Timoshenko, McGraw-Hill, 1934, pp. 344–7). In these calculations the lengthwise radii of curvature $r_l$ of the teeth in the normal section may be obtained from the equation:

$$r_{l,1,2}=\frac{R_{1,2}}{\sin^2\psi\,\sin\phi_n} \tag{7}$$

Approximate values of the semiaxis b, however, may be obtained from the expression:

$$b=1.825Sr_n\left(\frac{1}{E_1}+\frac{1}{E_2}\right) \tag{8}$$

where S is maximum allowable surface stress, $r_n$ is from Equations 2, 3, and 6, and $E_1$ and $E_2$ are the moduli of elasticity for the mating gears.

Equation 8 is useful primarily for selecting the pitch for a particular set of mating gears. Optimum capacity in this system is obtained not by using the minimum number of teeth that can be mated without interference, as in the involute system, but by using the maximum number of teeth that can be employed without the minor axis of the contact area ellipse (2b) exceeding the slant height of the teeth. This insures that the teeth will have the minimum possible circular pitch, which in turn maximizes the number of contact points for any given face width and helix angle. This general objective of minimizing the circular pitch to obtain a large number of contact points will also be served by making the working profile extend over more or less equal arcs on either side of the pitch point, as shown in FIG. 4. This further optimizes capacity by locating the maximum surface stress S at the point where the sliding velocity is zero.

While the tooth system herein disclosed may be used for cut gearing in applications requiring higher efficiencies than are obtainable with involute gearing (i.e., gears inclined to overheat due to brief intensive use, as in racing vehicles), the primary objective of the invention is to devise a type of gear adapted to be molded. In this context, as well as in the claims, a "moldable material" is intended to encompass materials capable of being formed against a finished die or mold surface with no separate finishing operation involving scraping, cutting or grinding of material from the tooth surface, as for example by molding, plastic casting, extruding or die casting. A "dry bearing material" is one intended to be used in unlubricated journal bearings. These usually carry a PV rating and at present include such materials as tetrafluoroethylene or graphite; nylon, tetrafluoroethylene or phenolic filled with molybdenum disulfide, glass fiber, lead, or graphite; sintered materials such as bronze, aluminum, iron, or nylon filled with oil, lead tetrafluoroethylene, molybdenum disulfide or graphite or combinations thereof; and hard materials such as steel or die cast aluminum which have a low friction surface of vapor deposited dry film or baked tetrafluoroethylene.

From the above explanation it will be evident that numerous advantages accrue from the gearing herein disclosed. The use of tooth profiles specifically designed to violate the "law of gearing" enables the action of the gearing to be entirely confined to the region of the pitch line so that sliding velocities between mating teeth are substantially zero. The effect of this is to reduce the frictional losses to the point where dry bearing materials may be used for the teeth as well as a variety of soft moldable materials of low thermal conductivity. Gears made of these materials will be exceptionally economical.

In addition to being economical, gears embodying the present invention are highly efficient, extremely durable, quiet and capable of transmitting, at least at speeds of 1725 r.p.m. and above, substantially as much power as the finest cut gearing. In some high speed applications where the operating conditions are closely controlled, gears may be designed embodying the invention in such a way that their radial growth or cold flow due to centrifugal effect will substantially offset tooth wear.

Further advantages of the gears embodying the system herein disclosed are that they may be made interchangeable with no loss of capacity and are relatively insensitive to axial misalignment, molding distortion or changes in center distance.

The specific description given above of the preferred form of the invention should not be taken as restrictive as it will be apparent that various modifications in design may be resorted to by those skilled in the art without departing from the scope of the following claims.

I claim:

1. In a pair of mating gears, teeth formed to extend across the rims of said gears in a direction slantingly disposed with respect to the pitch line of said pair to produce at least one area of contact between said pair for all rotational positions of said pair,

[said teeth being formed so that the centroid of said area of contact lies substantially on said pitch line for all rotational positions of said gears.]

*said teeth having in sections perpendicular to said pitch line active profiles of relative radius of curvature at the pitch lines less than the product of the pitch radii of said pair times the sine of the pressure angle divided by the sum of said pitch radii,*

*addendum height of the teeth of one of said pair being greater than 0.5 divided by the normal diametral pitch and the pitch and pressure angle of the teeth are such that when the maximum allowable torque is applied to said gears each said area of contact occupies substantially the full height of the tooth face.*

[2. In a pair of mating gears, teeth formed to extent across the rims of said gears at a sufficient angle with respect to the pitch line of said pair to produce at least two separate areas of contact between said pair, said teeth having in sections perpendicular to said pitch line active profiles of relative radius of curvature at the pitch line less than the product of the pitch radii of said pair times the sine of the pressure angle divided by the sum of said pitch radii.]

[3. A pair of mating gears according to claim 1 or 2 wherein the pitch and pressure angle of the teeth are such that when the maximum allowable torque is applied to said gears each said area of contact occupies substantially the full height of the tooth face.]

4. A pair of mating gears according to claim 1 [or 2] wherein the centers of curvature of said teeth at said area of contact are substantially removed from said pitch line.

5. A pair of mating gears according to claim 1 [or 2] wherein the teeth of at least one gear are formed of moldable material.

6. A pair of mating gears according to claim 1 [or 2] wherein the active profiles of the teeth in the normal plane are circular arcs.

7. A pair of mating gears according to claim 1 [ or 2 ] wherein the active profiles of the teeth in planes normal to the pitch line are circular arcs.

8. A pair of mating gears according to claim 1 [ or 2 wherein ] *wherein* the active faces of the teeth of at least one gear are of dry bearing material.

9. A pair of mating gears according to claim 1, wherein said teeth have in sections perpendicular to the elements of the respective pitch surfaces of said gears active profiles which are intersected by said pitch surfaces at the central portions of said profiles [ , the relative radius of curvature of engaging segments of said central portions being less than the relative radius of curvature of conjugate profiles ].

[ 10. The method of reducing the average sliding velocity of the teeth of mating gears below the average sliding velocity attainable with conjugate gears of the same pitch line velocity, comprising forming said teeth:

(a) to extend across the rims of said mating gears in a direction slantingly disposed with respect to the pitch line of said mating gears, (b) with active profiles which are intersected by the respective pitch surfaces of said mating gears, and (c) with active profiles of relative radius of curvature less than the relative radius of curvature of conjugate profiles. ]

* * * * *